Dec. 22, 1942.          W. H. KIMPTON            2,306,268
                    PIRN-WINDING MACHINERY
              Filed July 17, 1940         5 Sheets-Sheet 1

W. H. KIMPTON
INVENTOR

ATTORNEYS

Dec. 22, 1942.   W. H. KIMPTON   2,306,268
PIRN-WINDING MACHINERY
Filed July 17, 1940   5 Sheets-Sheet 2
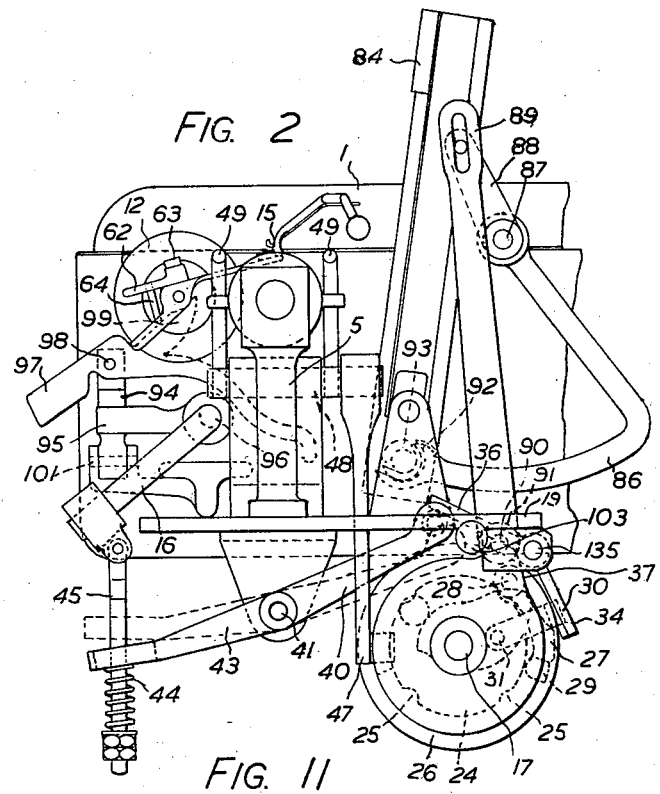
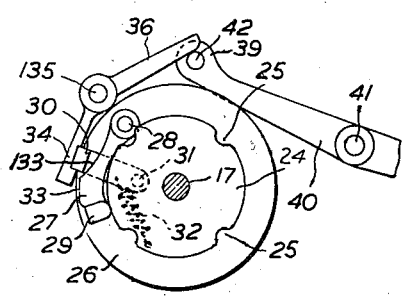
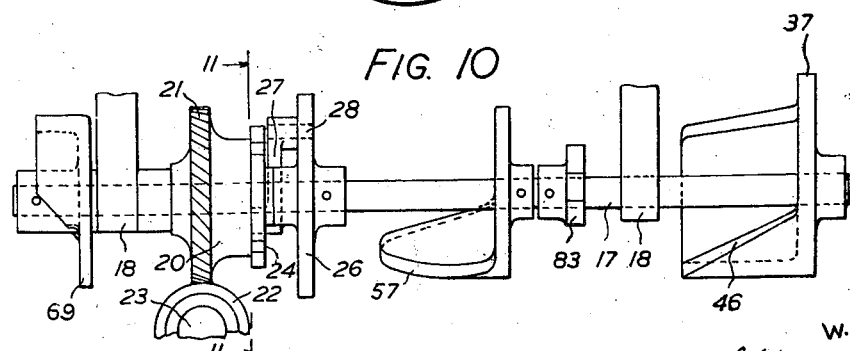
W. H. KIMPTON
INVENTOR
ATTORNEYS

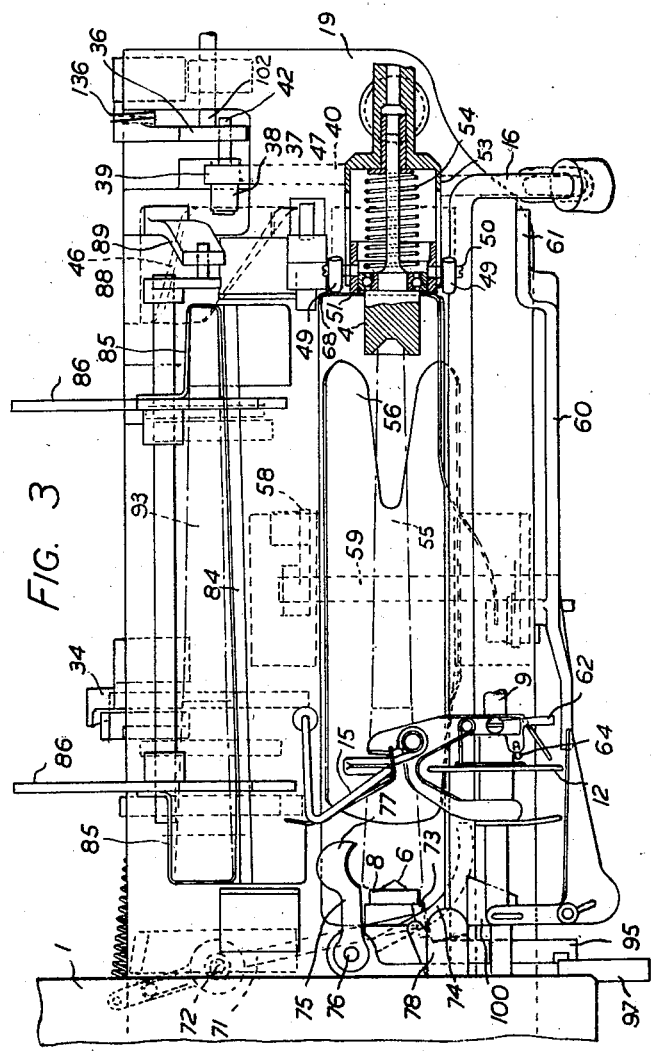

Dec. 22, 1942.    W. H. KIMPTON    2,306,268
PIRN-WINDING MACHINERY
Filed July 17, 1940    5 Sheets-Sheet 4

W. H. KIMPTON
INVENTOR
ATTORNEYS

Dec. 22, 1942.  W. H. KIMPTON  2,306,268
PIRN-WINDING MACHINERY
Filed July 17, 1940   5 Sheets-Sheet 5
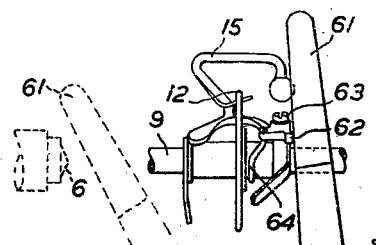
FIG. 5
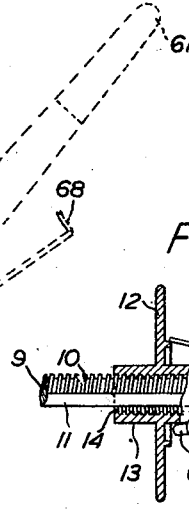
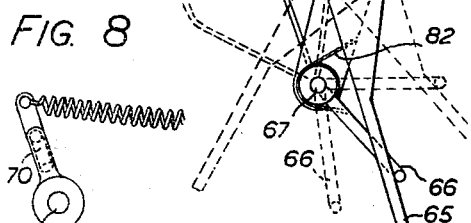
FIG. 8
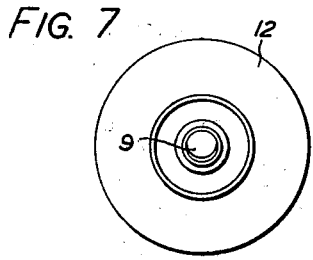
FIG. 6
FIG. 7
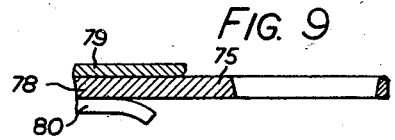
FIG. 9
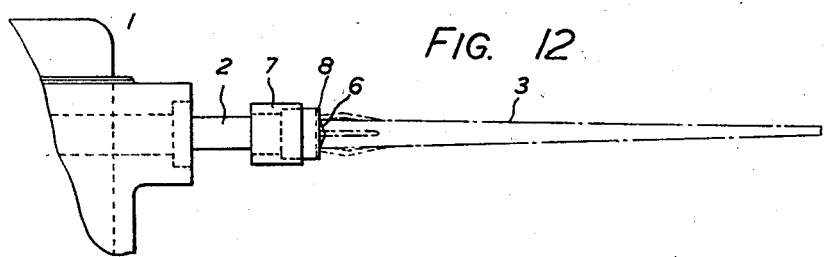
FIG. 12
W. H. KIMPTON
INVENTOR
ATTORNEYS Patented Dec. 22, 1942

2,306,268

UNITED STATES PATENT OFFICE 2,306,268

PIRN-WINDING MACHINERY

William Harry Kimpton, Spondon, near Derby, England, assignor to Celanese Corporation of America, a corporation of Delaware Application July 17, 1940, Serial No. 346,018
In Great Britain August 2, 1939

4 Claims. (Cl. 242—41)

This invention relates to automatic pirn-winding mechanism of the "spindleless" type in which a pirn tube is pressed against a driving member, (e. g. a short "spindle"), a traversing device is movable lengthwise of the tube, and a handle provides for the starting and stopping of the mechanism.

The invention is particularly concerned with mechanism for effecting automatic donning and doffing of independent pirn-winding spindles, such mechanism either being incorporated in or built on to the gear-box unit by which the spindle and its traverse mechanism are driven and operated or capable of being applied as an attachment to such unit for converting a non-automatic spindle into an automatic one. When the mechanism is provided as an attachment, it may be applied to the "spindle" type of machine by removal of the usual protruding length of the spindle, and the addition of a slight modification to the shortened end of the spindle, and by the provision of release means to permit the traverse mechanism to be returned to the base of the pirn, as is set out in greater detail below.

The mechanism according to the invention comprises a cam-shaft, a clutch for setting the cam-shaft in motion on completion of winding, a magazine, means for transferring a pirn-tube from the magazine to winding position, a thread-trapping and cutting device disposed near the tube-driving member, a plurality of cams on the cam-shaft, and simple lever connections from the cams to enable the rotation of the shaft to effect the withdrawal of the tube-pressing means, a movement of the traversing device towards the tube-driving means, operation of the thread-trapping and cutting device, transfer of a tube from the magazine to the winding position, release of the thread-trapping means, movement of the starting and stopping handle to starting position, and release of the clutch.

The lever connection for returning the traversing device may be used to connect with a lever that serves to position the thread for engagement between the tube-driving member and the end of the tube transferred from the magazine and for engagement by the thread-trapping and cutting device. A preferred form of thread-trapping and cutting device comprises an arm having a cutting edge, and a pair of members between which the arm passes, one member co-operating with one side of the arm to trap the thread, and the other having a cutting edge co-operating with the edge on the arm to cut the thread after it has been trapped.

Simple profile cams, which may be castings requiring little more than boring to enable them to be secured to the cam-shaft, can be used to operate the various levers, which themselves are simple in form.

The automatic doffing and donning mechanism can be built as a unit independent of the spindle-driving and traverse-operating mechanism and may, therefore, be readily applied to existing designs of pirn-winding machines with little structural modification and without alteration of the basic method of operation of the machine. Although each mechanism operates independently, it is convenient to drive a plurality of the mechanism by common means, which enables the invention to be readily applied to the usual type of pirn-winding machine having several spindle units on a common frame, for example, several gear boxes each carrying a pair of spindles protruding from one side or pairs of spindles protruding from opposite sides.

The invention will now be described in greater detail with reference to the accompanying drawings, in which Fig. 1 is an elevation of the left-hand side of the mechanism as applied to a Universal No. 90 pirn-winding unit; the view is taken on the line 1—1 of Fig. 4, and thus does not include the part of the mechanism to the right of that line;

Fig. 2 is a front elevation of Fig. 1, likewise omitting the part of the mechanism of Fig. 4 not included in Fig. 1;

Fig. 3 is a plan of Fig. 1, but including the part of the mechanism shown to the right of the line 1—1 of Fig. 4;

Fig. 5 is a left-hand elevation (corresponding to Fig. 1) of the part of the mechanism of Fig. 4 omitted from Fig. 1;

Fig. 6 is a part-sectional detail of part of the traverse mechanism shown in Figs. 1 and 5;

Fig. 7 is a front elevation of part of Fig. 6;

Fig. 8 is a plan view of the operating mechanism of a trapping and cutting device shown in Fig. 3;

Fig. 9 is a diagrammatic elevation to a larger scale of the trapping and cutting device;

Fig. 10 is a view of the cam- and clutch-shaft of Fig. 1;

Fig. 11 is a part-sectional elevation of the clutch taken on the line 11—11 of Fig. 10;

Fig. 12 shows how the normal winding spindle of the No. 90 unit may be modified for the purpose of the invention;

1 is the gear box of a Universal No. 90 pirnwinding machine, which is usually arranged to drive two spindles. The box contains two clutches for each winding mechanism, one for driving the spindle 2, and the other for actuating the traverse mechanism. The mechanism according to the invention makes the ordinary use of these clutches by operating control gear external of the box and it is, therefore, not necessary for the internal mechanism of the box to be shown. It is, however, necessary to describe briefly the main elements of the pirn-winding mechanism to which the invention is applied.

Figure 1:
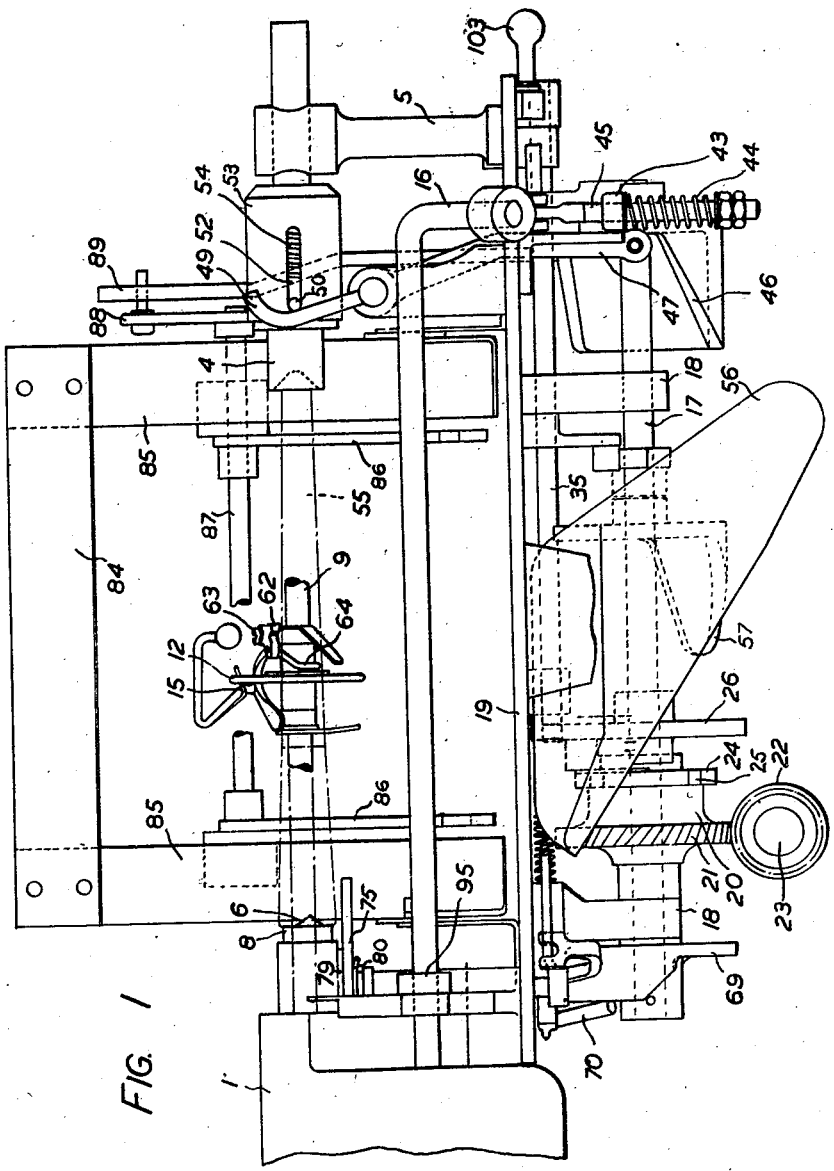
Figure 13:
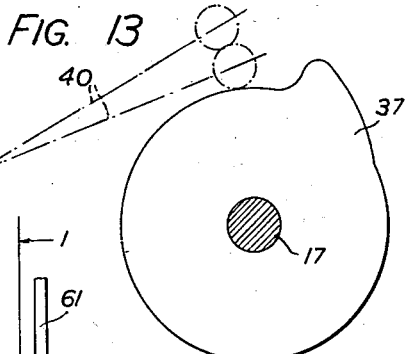
Figs. 13, 14, 15, 16 and 17 are elevations or developments of the controlling cams.
Figure 4:
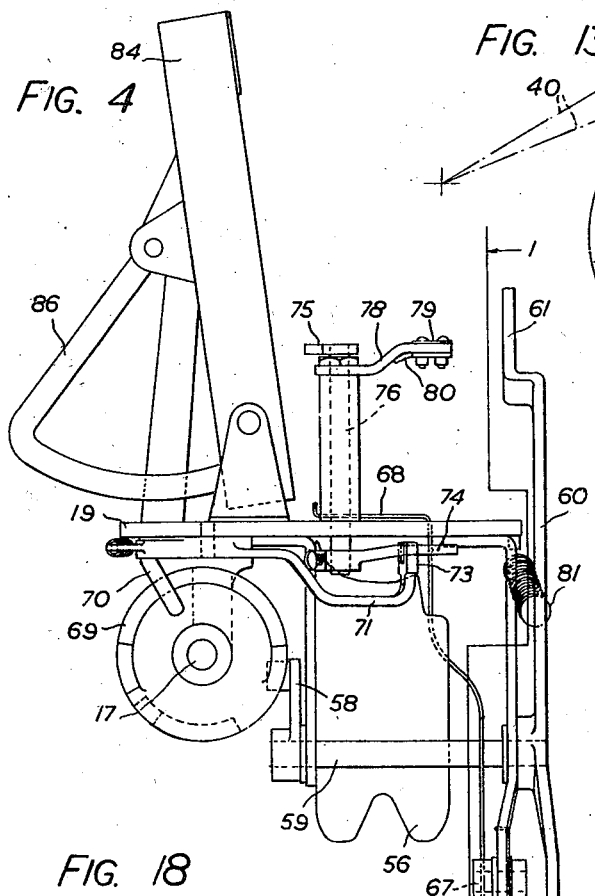
Fig. 4 is a rear elevation of the mechanism shown in Figs. 1 and 3.
Figure 17:
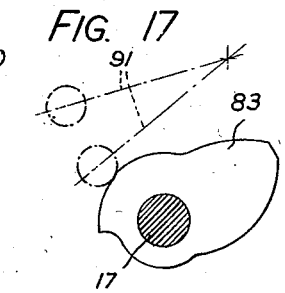

Normally the spindle 2 extends as shown in dotted lines 3 in Fig. 12, sufficiently to protrude through a pirn tube, the end of the spindle entering a spring-loaded rotary cup 4 (Figs. 1 and 3) mounted in an outboard support 5. For the purpose of the invention, the spindle is curtailed as shown in Fig. 12 and provided with a blunt point 6 and a collar 7 faced with rubber as shown at 8 to provide a driving connection with the base of a pirn tube.

Parallel to the spindle line extending from the point 6 to the cup 4 and lying to the left of it is a traverse bar 9 operated within the box 1 to have a traversing motion equal to the length of the nose of the pirn. At the side of the bar 9 facing the pirn position, the bar is half-threaded as shown at 10 (Fig. 6), the other half of the bar being plain as shown at 11. A feeler disc 12 is carried on the bar 9, the boss 13 of the disc being threaded to correspond with the threads 10, the bore 14, however, being enlarged, so that the collar can be pressed to one side to free itself from the threads. During the traversing of the bar 9, the thread is built up on the nose of the pirn and from time to time the disc 12 touches the yarn and a driving contact is established that rotates the disc on the rod 9 and the disc is screwed slightly along the rod. In this way the thread guide 15 connected to the disc 12 is gradually carried towards the tip of the pirn tube. When the pirn has reached a predetermined length, the normal trip mechanism provided with the box 1 operates to release a starting and stopping lever 16 by means of which two clutches within the box are disengaged to stop the rotation of the spindle 2 and the operation of the traverse rod 9.

These normal winding and traversing functions are carried out in the apparatus as modified by the invention, i. e. once winding has been started on a pirn tube the traversing device continues to progress slowly towards the tip of the tube until a predetermined length has been wound and the winding and traversing stopped automatically. Instead, however, of the pirn tube having to be replaced manually by an empty tube and the machine restarted by hand the whole of these operations are effected mechanically.

In order to permit discharge of the completed pirn the machine is converted to the "spindleless" type by curtailment of the normal spindle 3 so that a pirn tube is pressed between the rubber face 8 on the end of the spindle and the rotatable cup 4. The pirn is released by withdrawing the cup 4 by mechanism controlled from a cam shaft 17 which is set into operation immediately on completion of a pirn. The cam shaft 17 lies parallel to the spindle 2, being carried by bearings 18 depending from a horizontal plate 19 that projects outwardly from towards the base of the box 1. Loosely mounted on the shaft 17 is a driving member 20 carrying a worm wheel 21 in constant mesh with a worm 22 on a constantly driving shaft 23 running at right angles to the shaft 17 and capable of effecting the driving of the automatic mechanisms of any convenient number of pirn-winding spindles arranged side by side in the usual manner.

The driving member 20 carries a disc 24 notched at several points 25 round its periphery. The disc 24 can be clutched to the shaft 17 by the following means: A clutch disc 26 secured to the shaft has a lever 27 pivoted to it at 28, and the nose 29 of the lever 27 overhangs the disc 24 so as to be capable of entering the notches 25. A locking lever 30 pivoted at 31 to the disc 26 is urged by a spring 32 towards the position in which its end overhangs the flat 33 on the lever 27, but the lever 30 may be restrained by means of a lever 34 carried by a rod 35 (Fig. 1) pivoted at 135 (Fig. 2) at the forward end of which is a lever 36. A spring 136 (Fig. 3) tends to rock the levers 34, 36 anti-clockwise (Fig. 11) to free the lever 34 from the lever 30. A cam 37 on the shaft 17 engages a follower 38 on the right hand end 39 of a lever 40 pivoted at 41. A pin 42 protruding from the end 39 of the lever lies below the lever 36. The left hand end 43 of the lever 40 is connected by the spring 44 and rod 45 with the end of the starting lever 16.

When tripping of the mechanism in the box 1 takes place on completion of a pirn the lever 16 swings clockwise from the position shown in Fig. 2 to a horizontal position. The end 39 of the lever 40 drops to allow the spring 136 to lower the lever 36 and raise the lever 34, thus permitting the locking lever 30 to ride up the incline 133 (Fig. 11) of the lever 27 towards the flat 33 and urge the end 29 of the lever against the periphery of the driving disc 24. When the rotation of the disc 24 brings one of the notches 25 below the end of lever 27, the end 29 enters the recess and the lever 27 is locked in that position by the lever 30. The lever 27 is thus driven round with the disc 24, dragging the clutch disc 26 and the cam shaft 17 with it.

As soon as the shaft 17 rotates, a second cam 46 rocks a lever 47 pivoted at 48 and a pair of lever arms 49 extending upwardly from the pivot 48 engage pins 50 protruding from the bearing 51 of the cup 4 through slots 52 in the bearing housing 53. The cup 4 is thus moved outwards against the action of a spring 54 so that the forward end of the pirn tube 55 is allowed to drop. The completed pirn then falls into a slide 56 for discharge into a suitable container.

The thread from the traverse guide 15 remains attached to the completed pirn and the next combined operation is to position the thread for attachment to a replacement tube and to return the traverse mechanism towards the spindle 2. A third cam 57 on the shaft 17 operates a follower lever 58 carried by a spindle 59 to which is secured a lever 60, cranked at its upper end as shown at 61, the lever 60 being movable in a vertical plane parallel to the traverse rod 9. The operation of the cam 57 is to move the lever 60 clock-wise (Fig. 5). The lever 60 makes early engagement with a lever 62 carried by the traverse mechanism 15. The lever 62 is pivoted at 63 and carries a pin 64 that pushes the collar 13 of the building disc 12 out of engagement with the threads 10 of the bar 9. Continued pressure of the lever 60 on the lever 62 pushes the building disc 12 and the rest of the traverse mechanism along the rod 9 towards the box 1.

The lower end 65 of the lever 60 engages a lever 66 pivoted at 67, the upper end 68 of the lever 66 thus being carried across the path of the thread extending from the guide 15 to the fallen pirn. The thread is thus swept towards the rubber face 8 of the spindle 2. The cam 57 holds levers 60 and 66 in their left-hand position while the thread is trapped and cut.

A fourth cam 69 operates a depending follower arm 70 of lever 71 pivoted at 72, the lever 71 ending in a fork 73 that engages with a lever 74 connected to a trapping and cutting arm 75 pivoted at 76. The sickle-shaped end 77 of the arm 75 moves across the thread already positioned over the rubber face 8 and carries it into a combined trapping and cutting member 78.

The device 78 comprises an upper member 79 of spring steel, the lower edge of which is rounded and a lower cutting member 80, the top of which is sharp. The members 79, 80 form a channel into which the thread is pressed by the end 77 of the arm 75, the top edge of the end being rounded and the lower edge of which is sharpened. The member 79 protrudes beyond the member 80, so that as the arm enters the channel its upper edge co-operates with the lower edge of the member 79 to trap the thread running back to the guide 15, and then its sharp lower edge co-operates with the sharp upper edge of the member 80 to cut the thread below the point at which it is trapped.

With the traverse mechanism moved near to the spindle 2 and the thread trapped and held across the face of the spindle, the cam 57 allows the levers 60, 68 to move anti-clockwise, springs 81, 82 effecting these movements.

A fifth and remaining cam 83 on the shaft 17 serves to bring an empty pirn tube into winding position. A supply of pirn tubes is carried in a slightly inclined magazine 84 between the channelled end plates 85 of which a pair of transferring arms 86 carried by a rod 87 are able to move. The arms 86 are operated by means of a lever 88 on the rod 87 having a pin-and-slot connection with a lever 89 secured to a rod 90, a cam follower lever 91 on the rod 90 engaging the cam 83. The ends of the arms 86 are forked as shown at 92 to engage the lowermost tube 93 in the magazine 84 and operation of the lever 89 by the cam 83 causes the arms to lift the tube into line with the point 6 of the spindle 2 and with the cup 4, after which the lever arms 49 are withdrawn by the cam 46 to allow the spring 54 to press the cup 4 against the end of the tube 93, the base of the tube being pressed against the rubber face 8 to trap the end of the thread proceeding from the guide 15.

The cam 69 then releases the trapping arm 75 to free the end of the thread. The cam 83 then returns the arms 86 to the position shown in Fig. 2. The mechanism is now ready for winding to begin on the new tube 93. The cam 37 lifts the end 39 of the lever 40 and the end 43 of the lever compresses the spring 44 and through the rod 45 returns the starting lever 16 to the position shown in Fig. 2. The usual catch 94 engages a lever 95 carried on the spindle 96 of the starting lever 16 near the box 1 to hold the lever 16 in running position. The lever 16 re-engages the clutches inside the box 1 in the usual manner for the spindle 2 to begin rotating and for the bar 9 to begin traversing. The catch 94 is the one carrying the trip lever 97 which by the normal mechanism (not shown) of the Universal No. 90 machine is rocked about its pivot 98 on the catch to bring a projection 99 into the path of a member 100 traversing with the rod 9 when the pirn is fully wound. The return stroke of the rod drives the lever 97 towards the box 1 and rocks the catch 94 about its pivot 101, to release the lever 95 and allow the handle 16 to move to "stop" position.

As the shaft 17 approaches the end of one revolution, the locking lever 30 meets the end of the lever 34 which by the raising of the lever 36 by the pin 42 on the lever 40 has been rotated in a clockwise direction. The rocking lever 30 is thus prevented from continuing its rotation with the disc 26 and is thereby withdrawn from the flat 33 of the clutch lever 27 as the lever 27 still continues to rotate with the disc 26. The lever 27 is thus free to move about its pivot 28 so that its end 29 rises from the notch 25 of the disc 24 with which it has been in engagement. Driving connection is thus broken between the disc 26 of the shaft 17 and the driving member 24, and the cam shaft 17 comes to rest.

Figure 18:
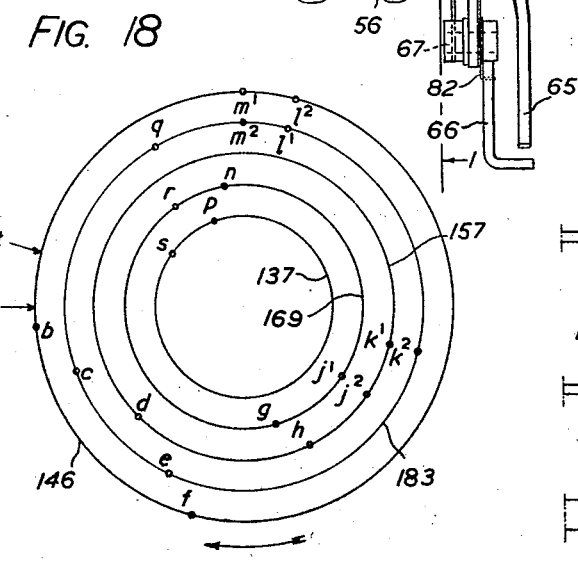
Fig. 18 is a timing diagram.
Figure 14:
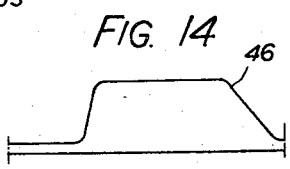
Figure 15:
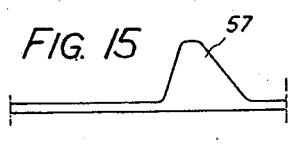
Figure 16:
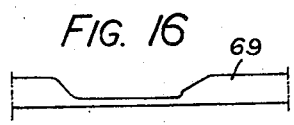

The timing of the mechanism is indicated by Fig. 18. The 5 circles 137, 146, 157, 169 and 183 represent the full revolutions of the cams 37, 46, 57, 69 and 83 operating respectively the starting lever 16, the cup 4, the levers 60, 68, the cutter arm 77, and the magazine arms 86. The camshaft 17 begins to move at $a$ and immediately afterwards ($b$) the cup 4 is withdrawn for the completed pirn to fall. At $c$ the arms 86 move back slightly to permit an empty tube to fall from the magazine into the forks 92. The lever 60 pushes the traverse mechanism back at $d$, until, with the magazine arms fully back at $e$ and the cup 4 fully withdrawn at $f$, the cutter arm 77 begins to move at $g$, just before the lever 60 completes its stroke at $h$.

The cutter has trapped and cut the thread at $j^1$ and at the same time the lever 60 is free to return ($j^2$), a movement it completes at $k^1$, just as the magazine arms 86 move forward ($k^2$) to lift the empty tube into line with the cup 4 and the spindle nose 6, which movement is completed at $l^1$. At that time, the cup 4 starts to close on the tube ($l^2$), completing this by $m^1$, when the arms 86 are free to return ($m^2$).

The thread is now trapped between the base of the tube and the rubber facing 8, and can be released by the arm 77 ($n$). The lever 40 begins to move at $p$, and after the arms 86, 77 have returned to their original position ($q$, $r$), the lever 40 pulls down the starting lever 16 ($s$) and causes the lever 34 to dis-engage the clutch on the shaft 17 ($t$) and bring the automatic operation to an end. The lever 27 is freed from the disc 25 as the revolution ends at $a$.

A safety catch comprising a pin 102 that can be pushed under the lever 36 by a knob 103 enables the automatic mechanism to be put out of action.

The mechanism is simple in character, and, by the slight modification to the normal spindle shown in Fig. 10 and the provision of the lever 62 on the traverse mechanism, enables a "spindle" type of pirn-winding machine to be readily converted to automatic operation. Each winding spindle of the box 1 is capable of independent operation, which permits of maximum output, since a failure of thread supply or a thread breakage at one spindle does not affect any other. The mechanism, moreover, does not add to the space occupied by the winding mechanism to which it is applied, so that the advantages of automatic working can be obtained without modifying the close spacing of the machines in a pirn-winding plant.

The mechanism can itself be built as a unit based on the plate 19, which is attached to the front of the box 1. The cam-shaft 17 is carried below the plate, so that the compact assembly of cams and the clutch are protected by the plate. Above the plate, the magazine 84, the cutting and trapping device 75, 78, and the levers 49 for withdrawing the cup 4 are so arranged that ready access to the winding mechanism proper is available.

The several cams on the shaft 17 all operate their followers against spring action, and therefore have simple profiles (either peripheral or end) that allow the cams to be cast and prepared for assembly with very little machinery. The peripheral-cam 37 is cast integral with the end-cam 46, so that only four separate cam members are needed.

The slow-running worm-shaft 23 by which the cam-shaft 17 is operated when the discs 24, 26 are clutched together is driven in any suitable way, its speed being such that the one-revolution cycle of the shaft 17 in which the doffing and donning are effected is completed in a few seconds.

Having described my invention, what I desire to secure by Letters Patent is:

1. Automatic pirn-winding mechanism of the "spindleless" type in which a pirn-tube is pressed against a driving member, and a traversing device is movable lengthwise of the tube until winding is complete, and having a starting and stopping handle, said mechanism comprising a cam-shaft extending in the same general direction as the pirn-tube and the traversing device, a clutch for setting the cam-shaft in motion on completion of winding, a magazine, means for transferring a pirn-tube from the magazine to winding position, a thread-trapping and cutting device disposed near the tube-driving member, a plurality of cams disposed over the length of the cam-shaft, and appropriately disposed simple lever connections from the cams to enable the rotation of the cam shaft to effect the withdrawal of the tube-pressing means, a movement of the traversing device towards the tube-driving means, operation of the thread-trapping and cutting device, transfer of a tube from the magazine to the winding position, release of the thread-trapping means, movement of the starting and stopping handle to starting position, and release of the clutch.

2. Mechanism according to claim 1, a lever connected to the lever connection for returning the traversing device that serves to position the thread for engagement between the tube-driving member and the end of the tube transferred from the magazine and for engagement by the thread-trapping and cutting device.

3. Mechanism according to claim 1 wherein the traversing device carries a releasing lever that is engaged by the lever connection for returning the traversing device, so that the lever connection first releases the traversing device and then returns it towards the tube-driving means.

4. Mechanism according to claim 1, wherein the thread-trapping and cutting device comprises an arm having a cutting edge, and a pair of members between which the arm passes, one member co-operating with one side of the arm to trap the thread, and the other having a cutting edge co-operating with the edge on the arm to cut the thread after it has been trapped.

WILLIAM HARRY KIMPTON.